(12) United States Patent
Umezaki et al.

(10) Patent No.: US 9,230,156 B2
(45) Date of Patent: Jan. 5, 2016

(54) DATA PROCESSOR, DATA PROCESSING SYSTEM, AND COMPUTER-READABLE RECORDING MEDIUM

(75) Inventors: Taizo Umezaki, Aichi (JP); Motoyasu Tanaka, Osaka (JP)

(73) Assignee: MegaChips Corporation, Osaka-shi (JP)

(*) Notice: Subject to any disclaimer, the term of this patent is extended or adjusted under 35 U.S.C. 154(b) by 63 days.

(21) Appl. No.: 14/002,591

(22) PCT Filed: Feb. 21, 2012

(86) PCT No.: PCT/JP2012/054171
§ 371 (c)(1),
(2), (4) Date: Sep. 3, 2013

(87) PCT Pub. No.: WO2012/117901
PCT Pub. Date: Sep. 7, 2012

(65) Prior Publication Data
US 2014/0003664 A1    Jan. 2, 2014

(30) Foreign Application Priority Data
Mar. 1, 2011  (JP) .................................. 2011-043705

(51) Int. Cl.
| | |
|---|---|
| G06K 9/00 | (2006.01) |
| G06T 7/20 | (2006.01) |
| G06K 9/32 | (2006.01) |
| G06K 9/62 | (2006.01) |

(52) U.S. Cl.
CPC ........ G06K 9/00248 (2013.01); G06K 9/00241 (2013.01); G06K 9/3208 (2013.01); G06T 7/204 (2013.01); G06K 9/6251 (2013.01); G06T 2207/30201 (2013.01)

(58) Field of Classification Search
USPC .................................. 382/103, 115–118, 154
See application file for complete search history.

(56) References Cited

U.S. PATENT DOCUMENTS

| | | | |
|---|---|---|---|
| 5,617,483 A | 4/1997 | Osawa | |
| 6,108,440 A * | 8/2000 | Baba et al. | 382/154 |
| 7,155,037 B2 * | 12/2006 | Nagai et al. | 382/118 |
| 7,783,084 B2 * | 8/2010 | Imagawa et al. | 382/118 |
| 8,599,266 B2 * | 12/2013 | Trivedi et al. | 348/169 |
| 2003/0123713 A1 * | 7/2003 | Geng | 382/118 |
| 2005/0074148 A1 * | 4/2005 | Rodyushkin et al. | 382/118 |
| 2006/0187305 A1 * | 8/2006 | Trivedi et al. | 348/169 |
| 2007/0165931 A1 * | 7/2007 | Higaki | 382/128 |
| 2009/0232363 A1 * | 9/2009 | Ohashi et al. | 382/118 |
| 2012/0288142 A1 * | 11/2012 | Gossweiler et al. | 382/103 |

FOREIGN PATENT DOCUMENTS

| | | |
|---|---|---|
| JP | 6 214970 | 8/1994 |
| JP | 2004 236186 | 8/2004 |
| JP | 2006 146479 | 6/2006 |

OTHER PUBLICATIONS

Hattori, K. et al., "Recognition of the Facial Direction Using a Kohonen Self Organizing Map—High Accurate Attitude Estimation Based on Interpolated Facial Image", Journal of Japanese Academy of Facial Studies, vol. 10, No. 1, pp. 29-36, (Sep. 24, 2010).

(Continued)

*Primary Examiner* — Alex Liew
(74) *Attorney, Agent, or Firm* — Oblon, McClelland, Maier & Neustadt, L.L.P.

(57) ABSTRACT

A data processor includes an obtainment part that obtains an image of a person's face, a creation part that creates a face direction map in which face images of the person facing respective directions are arranged, based on the image of the person's face obtained by the obtainment part, and a determination part that determines movement of the person's face, based on the face direction map and a moving image of the person's face obtained by the obtainment part.

14 Claims, 4 Drawing Sheets

(56) References Cited

OTHER PUBLICATIONS

International Search Report Issued Apr. 10, 2012 in PCT/JP12/54171 filed Feb. 21, 2012.
Office Action issued Feb. 18, 2014 in Japanese Patent Application No. 2011-043705 (with English language translation).

Katsuya Kanbayashi, et al., "A method for Detection of Person's nod Observed by a Mobile Camera" The Institute of Electronics, Information and Communications Engineers, vol. PRMU2010-157,No. MVE2010-82, Jan. 2011, pp. 53-57, (with English Abstract and partial English language translation).

* cited by examiner

DATA PROCESSOR, DATA PROCESSING SYSTEM, AND COMPUTER-READABLE RECORDING MEDIUM

FIELD OF THE INVENTION

The present invention relates to data processors, data processing systems, and programs, and more particularly, to a data processor, a data processing system and a program for determination of movement of a person's face based on an image of the person's face.

DESCRIPTION OF THE BACKGROUND ART

Patent Literature 1 below, for example, discloses a technique for extracting facial feature points such as eyes, a nose, and a mouth from an image of a person's face to determine which direction the person is facing based on the positions of such feature points.

CITATION LIST

Patent Literature

Patent Literature 1 JP2004-236186A

SUMMARY OF THE INVENTION

Problems to be Solved by the Invention

A method to determine which direction the person is facing based on the positions of the feature points, however, results in a vast amount of computing and increases processing load, and moreover, may determine a direction of a face incorrectly when, for example, a person is facing just beside, since feature points cannot be extracted accurately.

The present invention has been made in view of such situation, and is directed to obtaining a data processor, a data processing system, and a program that achieve determination of a direction of a face with reduced processing load and improved accuracy, in comparison with determination of a direction of a face based on feature points.

Means to Solve the Problems

A data processor according to a first aspect of the present invention includes obtainment means for obtaining an image of a person's face, creation means for creating a face direction map in which face images of the person facing respective directions are arranged, based on the image of the person's face obtained by the obtainment means, and determination means for determining movement of the person's face, based on the face direction map and a moving image of the person's face obtained by the obtainment means.

According to the data processor of the first aspect, the obtainment means obtains an image of a person's face, and the creation means creates a face direction map based on the image of the person's face obtained by the obtainment means. Then the determination means determines movement of the person's face, based on the face direction map and a moving image of the person's face obtained by the obtainment means. In this way, a face direction map of a person is created in advance, so as to enable the determination means to determine movement of a face by a simple process such as matching between the taken image and the images in the face direction map. Thus processing load is reduced, in comparison with determination of a direction of a face based on feature points. Moreover, the face direction map allows recording of a profile, which enables accurate determination of a profile even when a person is facing just beside. Accuracy of determination of a direction of a face is therefore improved, in comparison with determination of a direction of a face based on feature points.

A data processor according to a second aspect of the present invention is the data processor according to the first aspect, wherein the creation means estimates a three dimensional image of the person's face based on a two dimensional image of the person's face obtained by the obtainment means, and creates the face direction map based on the three dimensional image.

In the data processor according to the second aspect, the creation means estimates a three dimensional image of a person's face based on a two dimensional image of the person's face obtained by the obtainment means, and creates the face direction map based on the three dimensional image. Thus there is no need for a dedicated device for taking a three dimensional image of the person's face, with a general CCD camera for taking a two dimensional image being sufficient, which simplifies the device configuration and reduces product cost. Moreover, there is no need for taking face images from multiple directions to create the face direction map, which improves convenience of a user.

A data processor according to a third aspect of the present invention is the data processor according to the second aspect, wherein the creation means estimates the three dimensional image with a neural network.

In the data processor according to the third aspect, the creation means estimates the three dimensional image from the two dimensional image with a neural network. This achieves simplified estimation of a three dimensional image.

A data processor according to a fourth aspect of the present invention is the data processor according to the first aspect, wherein the creation means creates the face direction map based on a three dimensional image of the person's face obtained by the obtainment means.

In the data processor according to the fourth aspect, the creation means creates the face direction map based on a three dimensional image of the person's face obtained by the obtainment means. In this way, the face direction map of a person is created by taking a three dimensional image of the person, so as to improve accuracy in comparison with estimation of a three dimensional image from a two dimensional image. Moreover, there is no need for taking face images from multiple directions to create the face direction map, which improves convenience of a user.

A data processor according to a fifth aspect of the present invention is the data processor according to any one of the second to fourth aspects, wherein the creation means gradually rotates the three dimensional image in multiple directions to create an image of the person's face in each direction.

In the data processor according to the fifth aspect, the creation means gradually rotates the three dimensional image in multiple directions to create an image of a person's face in each direction. This achieves simplified creation of the face direction map.

A data processor according to a sixth aspect of the present invention is the data processor according to any one of the second to fourth aspects, wherein the creation means rotates the three dimensional image in multiple specific directions to create an image of the person's face in each specific direction, and creates an intermediate images between multiple images in the multiple specific directions with a neural network.

In the data processor according to the sixth aspect, the creation means rotates the three dimensional image in multiple specific directions to create an image of the person's face in each specific direction and creates an intermediate image between multiple images in multiple specific directions with a neural network. This achieves simplified creation of the face direction map.

A data processing system according to a seventh aspect of the present invention includes an image taking device and a data processor. The data processor includes obtainment means for obtaining an image of a person's face from the image taking device, creation means for creating a face direction map in which face images of the person facing respective directions are arranged, based on the image of the person's face obtained by the obtainment means, and determination means for determining movement of the person's face, based on the face direction map and a moving image of the person's face obtained from the image taking device by the obtainment means.

According to the data processing system of the seventh aspect, the obtainment means obtains an image of a person's face from the image taking device, and the creation means creates a face direction map based on the image of the person's face obtained by the obtainment means. Then the determination means determines movement of the person's face, based on the face direction map and a moving image of the person's face obtained by the obtainment means. In this way, a face direction map of a person is created in advance, so as to enable the determination means to determine movement of a face by a simple process such as matching between the taken image and the images in the face direction map. Thus processing load is reduced, in comparison with determination of a direction of a face based on feature points. Moreover, the face direction map allows recording of a profile, which enables accurate determination of a profile even when a person is facing just beside. Accuracy of determination of a direction of a face is therefore improved, in comparison with determination of a direction of a face based on feature points.

A program according to an eighth aspect of the present invention is a program for causing a computer installed in a data processor to function as obtainment means for obtaining an image of a person's face, creation means for creating a face direction map in which face images of the person's face facing respective directions are arranged, based on the image of the person's face obtained by the obtainment means, and determination means for determining movement of the person's face, based on the face direction map and a moving image of the person's face obtained by the obtainment means.

According to the program of the eighth aspect, the obtainment means obtains an image of a person's face, and the creation means creates a face direction map based on the image of the person's face obtained by the obtainment means. Then the determination means determines movement of the person's face, based on the face direction map and a moving image of the person's face obtained by the obtainment means. In this way, a face direction map of a person is created in advance, so as to enable the determination means to determine movement of a face by a simple process such as matching between the taken image and the images in the face direction map. Thus processing load is reduced, in comparison with determination of a direction of a face based on feature points. Moreover, the face direction map allows recording of a profile, which enables accurate determination of a profile even when a person is facing just beside. Accuracy of determination of a direction of a face is therefore improved, in comparison with determination of a direction of a face based on feature points.

Effects of the Invention

The present invention achieves determination of a direction of a face with reduced processing load and improved accuracy, in comparison with determination of a direction of a face based on feature points.

These and other objects, features, aspects and advantages of the present invention will become more apparent from the following detailed description of the present invention when taken in conjunction with the accompanying drawings.

DESCRIPTION OF THE INVENTION

Figure 1:
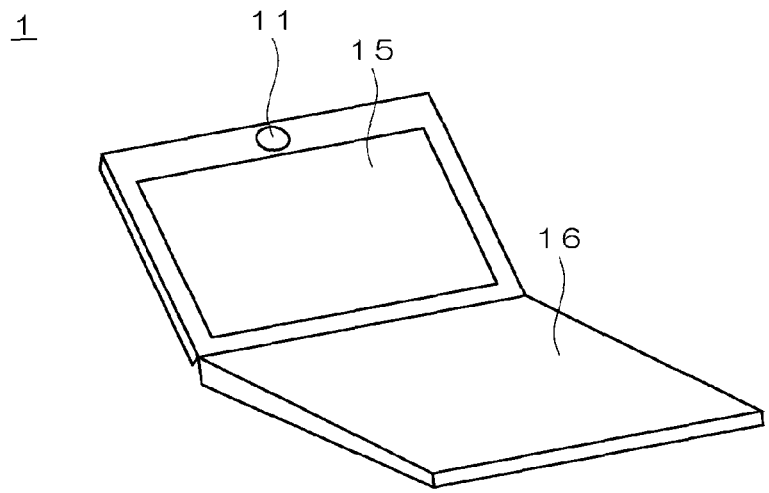
FIG. 1 is a schematic diagram illustrating a laptop personal computer as an example of a data processing system according to an embodiment of the present invention.

Preferred embodiments of the present invention are described in detail below referring to the drawings. It should be noted that identical reference numerals throughout the drawings indicate identical or equivalent elements.

Figure 2:
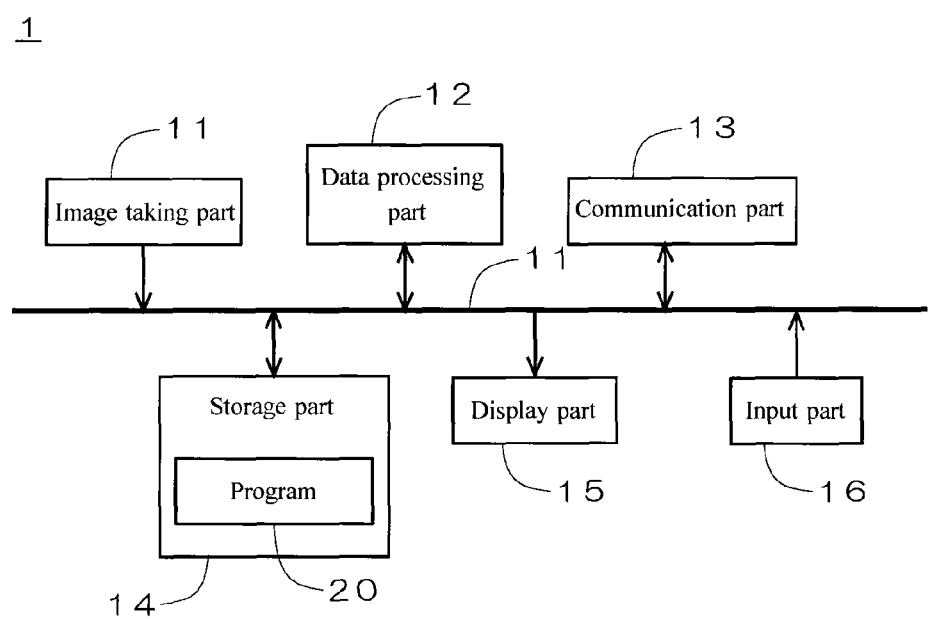
FIG. 2 is a diagram illustrating a hardware configuration of the personal computer.

FIG. 1 is a schematic diagram illustrating a laptop personal computer 1 as an example of a data processing system according to an embodiment of the present invention. FIG. 2 is a diagram illustrating a hardware configuration of the personal computer 1. As illustrated in FIGS. 1 and 2, the personal computer 1 includes an image taking part 11 such as a CCD camera, a data processing part 12 such as a CPU, a communication part 13 that communicates with an IP network or the like, a storage part 14 such as a hard disk drive and a semiconductor memory, a display part 15 such as a liquid crystal display, and an input part 16 such as a keyboard and a mouse. These devices are connected to each other via a bus 11. The storage part 14 stores a program 20.

Figure 3:
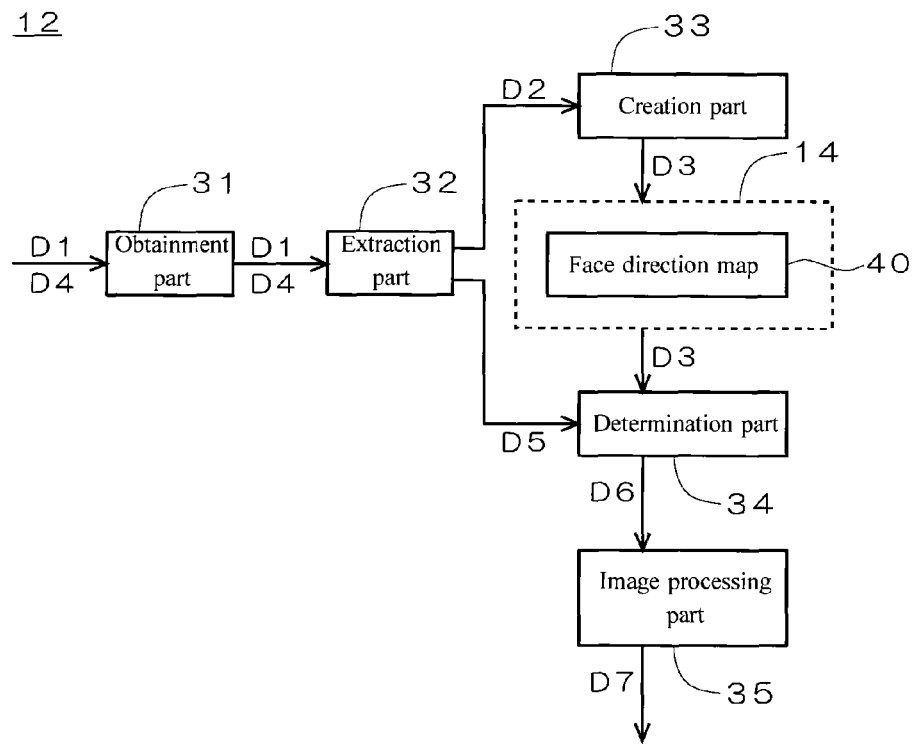
FIG. 3 is a block diagram illustrating a function implemented by a data processing part by performing a program.

FIG. 3 is a block diagram illustrating a function implemented by the data processing part 12 by performing the program 20. As illustrated in FIG. 3, the data processing part 12 includes an obtainment part 31, an extraction part 32, a creation part 33, a determination part 34, and an image processing part 35. In other words, the program 20 is a program to cause the data processing part 12 as a data processor to function as the obtainment part 31, the extraction part 32, the creation part 33, the determination part 34, and the image processing part 35.

The image taking part 11 takes a two dimensional image including a user's face.

The obtainment part 31 receives an input of image data D1 including the user's face from the image taking part 11. The image data D1 can be obtained by, for example, taking an image of the user's face from the front by the image taking part 11.

The extraction part 32 receives an input of the image data D1 from the obtainment part 31. The extraction part 32 extracts the user's face from the image data D1 by a well-known method such as binarization, edge extraction, and affine transformation. The extraction part 32 also generates image data D2 by compressing the image of the extracted face to a predetermined size available as an input image to a neural network.

The creation part 33 receives an input of the image data D2 of a user's face from the extraction part 32. The creation part 33 creates a face direction map 40 of the user based on the image data D2. The face direction map 40 is a map in which images of a user's face facing respective directions are arranged. In other words, the face direction map 40 includes images of a user's face taken from multiple directions.

Figure 4:
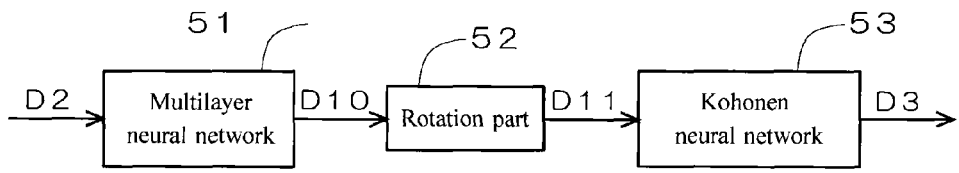
FIG. 4 is a diagram illustrating a configuration of a creation part.

FIG. 4 is a diagram illustrating a configuration of the creation part 33. As illustrated in FIG. 4, the creation part 33 includes a multilayer neural network 51, a rotation part 52, and a Kohonen neural network 53.

The multilayer neural network 51 receives an input of the image data D2, which is a two dimensional image of the user's face, from the extraction part 32. The multilayer neural network 51 estimates a three dimensional image based on the image data D2 to generate an image data D10, which is a three dimensional image of the user's face. The multilayer neural network 51 includes an input layer having multiple input units, an intermediate layer having multiple intermediate units, and an output layer having multiple output units. Appropriate weights, obtained from learning in advance, are assigned to each of the connections between each input unit and each intermediate unit, and between each intermediate unit and each output unit. In the learning, for example, a two dimensional image of a person's face is taken with a CCD camera and a range image of the person's face is obtained with a laser range finder. Then the two dimensional image taken with the CCD camera is used as an input image, and the range image obtained with the laser range finder is used as an instruction signal. By Learning multiple times with various people's faces, respective weights between each of the above units are set so that an appropriate three dimensional image is obtained from a two dimensional image of an arbitrary face.

The rotation part 52 receives an input of the image data D10 from the multilayer neural network 51. The rotation part 52 rotates the three dimensional image of the user's face, so as to create multiple two dimensional images of the user's face taken from a specific direction (hereinafter, "specific direction image"). For example, specific direction images facing the front, to the right, to the left, up, down, to the upper right, to the upper left, to the lower right, and to the lower left are created.

The Kohonen neural network 53 receives an input of the image data D11 of the specific direction images created by the rotation part 52. The Kohonen neural network 53 creates the face direction map 40 based on the image data D11. The Kohonen neural network 53 includes an input layer having multiple input units and an output layer having multiple output units. The specific direction images are inputted to the input layer. When a certain specific direction image is inputted to the input layer, this specific direction image is recorded in a certain specific output unit among all of the output units and in multiple output units within a predetermined learning radius around this specific output unit. When another specific direction image is inputted to the input layer, this specific direction image is recorded in another specific output unit and in multiple output units within a learning radius around this specific output unit. This process is performed on all of the specific direction images. In a portion where recorded regions of the specific direction images overlap each other, an intermediate image in which these specific direction images are integrated (or mixed) with each other is recorded. For example, in a portion where recorded regions of a face image facing the front and a face image facing to the right overlap each other, an intermediate image between the front and the right (image facing slightly to the right) is recorded. In this way, the Kohonen neural network 53 creates an intermediate image between multiple specific direction images, so as to create a face direction map 40, which is a self-organizing map.

Figure 5:
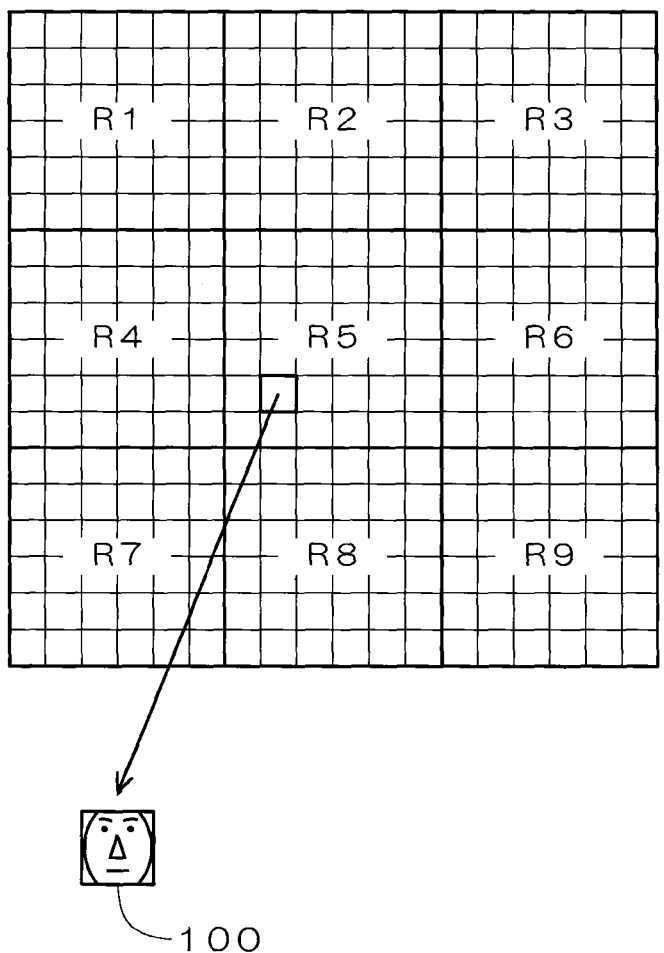
FIG. 5 is a diagram illustrating an example of a face direction map.

FIG. 5 is a diagram illustrating an example of the face direction map 40. The face direction map 40 is configured as an aggregate of the multiple output units 100 of the Kohonen neural network 53, each of the output units 100 indicating one face image of a user. In the regions R1, R2, R3, R4, R5, R6, R7, R8, and R9, face images of a user facing to the upper right, up, to the upper left, to the right, the front, to the left, to the lower right, down, and to the lower left are respectively recorded. In the face direction map 40, the face is facing upper in an upper side of the map, facing further down in the lower side, facing further to the right in the left side, and facing further to the left in the right side.

Referring to FIG. 3, the creation part 33 stores the face direction map 40 so created as described above in the storage part 14.

Operation after creation of the face direction map 40 is completed is next described. Description is given below of an example in which a user uses the personal computer 1 to access the Internet, so as to conduct avatar chat. In the avatar chat, a character called an avatar is allotted to each user to make such a presentation that when a user inputs a sentence with the personal computer 1, the avatar speaks the sentence with a speech balloon or the like, and then avatars communicate with each other in a virtual space.

While the user is conducting avatar chat, the image taking part 11 takes a two dimensional moving image including the user's face. The obtainment part 31 receives an input of moving image data D4 including the user's face from the image taking part 11. The extraction part 32 receives an input of the moving image data D4 from the obtainment part 31. The extraction part 32 employs a well-known method such as binarization, edge extraction, and affine transformation to extract the user's face from the moving image data D4.

The determination part 34 receives an input of moving image data D5 of the user's face from the extraction part 32. The determination part 34 determines movement of the user's face (nodding, head-shaking) based on the face direction map 40 read from the storage part 14 and the moving image data D5 inputted from the extraction part 32. Specifically, the determination part 34 searches all the face images included in the face direction map 40 for a face image having the highest similarity by pattern matching or the like, with respect to face images in each of the frames in the moving image data D5. Then if the portions identified as the face image having the highest similarity are tracked like regions R5→R8→R5, the movement of the user's face is determined to be nodding. In contrast, if the portions identified as the face image having the highest similarity are tracked like regions R5→R6→R5→R4→R5 or regions R5→R4→R5→R6→R5), the movement of the user's face is determined to be head-shaking.

The image processing part 35 receives an input of data D6 indicating the movement of the user's face from the determination part 34. The image processing part 35 outputs image data D7 that indicates an avatar making a nodding movement if the movement of the user's face is nodding, while it outputs image data D7 that indicates an avatar making a head-shaking movement if the movement of the user's face is head-shaking. The image data D7 is inputted to the display part 15, and the display part 15 presents avatar's movement. The image data D7 is also transmitted to a person with whom the user is chatting via the communication part 13 illustrated in FIG. 2, so that the avatar's movement is presented on the display of the person. It should be noted that as the movement of the user's face, not only nodding and head-shaking but also other movements such as head-tilting may be detected and incorporated in presentation of the avatar.

Figure 6:
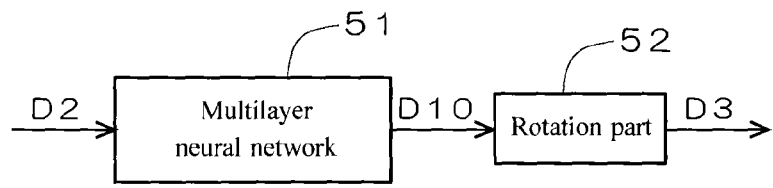
FIG. 6 is a diagram illustrating a first modification of the creation part.

FIG. 6 is a diagram illustrating a first modification of the creation part 33. The creation part 33 according to the present modification includes the multilayer neural network 51 and the rotation part 52.

The multilayer neural network 51 generates the image data D10, which is a three dimensional image of the user's face, in the same method as the above embodiment.

The rotation part 52 receives an input of the image data D10 from the multilayer neural network 51. The rotation part 52 gradually rotates the three dimensional image by a predetermined angle (for example, by a few degrees) from side to side and up and down, so as to create a two dimensional image of the user's face in each of the rotated position. Then the created two dimensional images are arranged on a map to create the face direction map 40.

Figure 7:
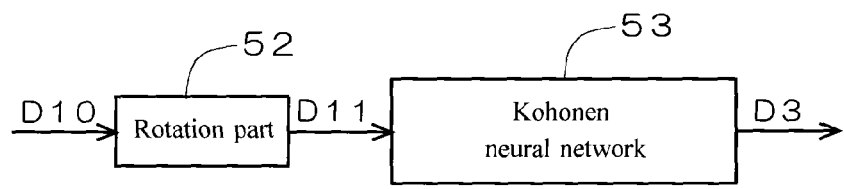
FIG. 7 is a diagram illustrating a second modification of the creation part.

FIG. 7 is a diagram illustrating a second modification of the creation part 33. The creation part 33 according to the present modification includes the rotation part 52 and the Kohonen neural network 53.

The rotation part 52 receives an input of the image data D10, which is a three dimensional image of the user's face. The three dimensional image of the user's face can be created by an arbitrary three dimensional measuring technique, and is obtained by the obtainment part 31.

For example, a vertically-striped color pattern of red, blue, and green with phases being shifted for each color is applied to a user from the front, and the image of the color pattern projected on the user is taken with a color camera placed diagonally to the front of the user.

Since the color pattern deforms with concavity and convexity of the user's face, analyzing the deformation enables creation of a three dimensional image of the user's face.

For another example, a time-of-flight (TOF) camera is employed to irradiate a user with an infrared ray and detect the infrared ray reflected from the user with a sensor of the TOF camera. Since the time the infrared ray takes (time of flight) to travel from the TOF camera to the user and back to the TOF camera differs depending on concavity and convexity of the user's face, analyzing the distribution of the time of flight enables creation of a three dimensional image of the user's face.

For another example, use of a stereo camera to take an image of a user enables creation of a three dimensional image of the user's face.

The rotation part 52 generates the image data D11 of the specific direction images in the same method as the above embodiment.

The Kohonen neural network 53 creates the face direction map 40 based on the image data D11, in the same method as the above embodiment.

Figure 8:
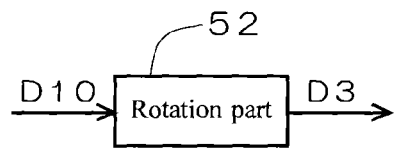
FIG. 8 is a diagram illustrating a third modification of the creation part.

FIG. 8 is a diagram illustrating a third modification of the creation part 33. The creation part 33 according to the present modification includes the rotation part 52.

The rotation part 52 receives an input of the image data D10, which is a three dimensional image of the user's face. The image data D10 is image data created by an arbitrary three dimensional measuring technique, similar to the above second modification. The rotation part 52 creates the face direction map 40 in the same method as the above first modification.

It should be noted that the above description is given of detecting movement of a user's face to incorporate to movement of an avatar, only as a non-limiting example of a use of the present invention. For example, use for an interactive robot that performs communication with a user may be possible, so that the robot detects the movement of the user's face and interprets the user's intention such as "yes" or "no" based on the detection.

As described above, according to the data processor of the present embodiment, the obtainment part 31 obtains an image of a person's face, and the creation part 33 creates the face direction map 40 based on the image of the person's face obtained by the obtainment part 31. Then the determination part 34 determines the movement of the person's face, based on the face direction map 40 and the moving image of the person's face obtained by the obtainment part 31. In this way, the face direction map 40 of a person is created in advance, so as to enable the determination part 34 to determine movement of a face by a simple process such as matching between the taken image and the images in the face direction map 40. Thus processing load is reduced, in comparison with determination of a direction of a face based on feature points. Moreover, the face direction map allows recording of a profile, which enables accurate determination of a profile even when a person is facing just beside. Accuracy of determination of a direction of a face is therefore improved, in comparison with determination of a direction of a face based on feature points.

Also according to the data processor of the present embodiment, the creation part 33 estimates a three dimensional image of a person's face based on a two dimensional image of the person's face obtained by the obtainment part 31, and creates the face direction map 40 based on the three dimensional image. Thus there is no need for a dedicated device for taking a three dimensional image of the person's face, with a general CCD camera for taking a two dimensional image being sufficient, which simplifies the device configuration and reduces product cost. Moreover, there is no need for taking face images from multiple directions to create the face direction map 40, which improves convenience of a user.

Also according to the data processor of the present embodiment, the creation part 33 illustrated in FIGS. 4 and 6 estimates a three dimensional image from a two dimensional image with the multilayer neural network 51. This achieves simplified estimation of a three dimensional image.

Also according to the data processor of the present embodiment, the creation part 33 illustrated in FIGS. 7 and 8 creates the face direction map 40 based on a three dimensional image of a person's face obtained by the obtainment part 31. In this way, the face direction map 40 of the person is created by taking a three dimensional image of the person, so as to improve accuracy in comparison with estimation of a three dimensional image from a two dimensional image. Moreover, there is no need for taking face images from multiple directions to create the face direction map 40, which improves convenience of a user.

According to the data processor of the present embodiment, the creation part 33 illustrated in FIGS. 6 and 8 gradually rotates the three dimensional image in multiple directions, so as to create an image of a person's face in each direction. This achieves simplified creation of the face direction map 40.

According to the data processor of the present embodiment, the creation part 33 illustrated in FIGS. 4 and 7 rotates the three dimensional image in multiple specific directions, so as to create an image of a person's face in each of the specific directions and creates an intermediate image between multiple specific direction images with the Kohonen neural network 53. This achieves simplified creation of the face direction map 40.

While the invention has been described in detail, the foregoing description is in all aspects illustrative and not restrictive. It is therefore understood that numerous modifications and variations can be devised without departing from the scope.

EXPLANATION OF REFERENCE NUMERALS

1 personal computer
11 image taking part
12 data processing part
14 storage part
20 program
31 obtainment part
33 creation part
34 determination part
40 face direction map
51 multilayer neural network
53 Kohonen neural network

The invention claimed is:

1. A data processor comprising:
circuitry configured to:
obtain an image of a person's face;
create a face direction map including a plurality of face images of the person facing a plurality of directions, the plurality of face images of the person facing the plurality of directions being created based on a same obtained image of the person's face; and
determine a type of movement of the person's face by tracking person a direction of the person's face in a specific order using the plurality of face images within the face direction map, wherein the specific order includes at least two face images of the plurality of face images, each of the at least two face image having a highest similarity with an obtained moving image of the person's face.

2. The data processor according to claim 1, wherein the circuitry is configured to estimate a three dimensional image of the person's face based on an obtained two dimensional image of the person's face and to create the face direction map based on the three dimensional image.

3. The data processor according to claim 2, wherein the circuitry is configured to estimate the three dimensional image with a neural network.

4. The data processor according to claim 3, wherein the circuitry is configured to gradually rotate the three dimensional image in the plurality of directions to create a respective image of the person's face in each direction.

5. The data processor according to claim 3, wherein the circuitry is configured to rotate the three dimensional image in a plurality of specific directions to create a respective image of the person's face in each specific direction, and to create an intermediate image between a plurality of images in the plurality of specific directions with a neural network.

6. The data processor according to claim 2, wherein the circuitry is configured to gradually rotate the three dimensional image in the plurality of directions to create a respective image of the person's face in each direction.

7. The data processor according to claim 2, wherein the circuitry is configured to rotate the three dimensional image in a plurality of specific directions to create a respective image of the person's face in each specific direction, and to create an intermediate image between a plurality of images in the plurality of specific directions with a neural network.

8. The data processor according to claim 1, wherein the circuitry is configured to create the face direction map based on an obtained three dimensional image of the person's face.

9. The data processor according to claim 8, wherein the circuitry is configured to gradually rotate the three dimensional image in the plurality of directions to create a respective image of the person's face in each direction.

10. The data processor according to claim 8, wherein the circuitry is configured to rotate the three dimensional image in a plurality of specific directions to create a respective image of the person's face in each specific direction, and to create an intermediate image between a plurality of images in the plurality of specific directions with a neural network.

11. A data processing system comprising:
an image taking device; and a data processor,
the data processor including circuitry configured to:
obtain an image of a person's face from the image taking device;
create a face direction map including a plurality of face images of the person facing a plurality of directions, the plurality of face images of the person facing the plurality of directions being created based on a same obtained image of the person's face; and
determine a type of movement of the person's face by tracking person a direction of the person's face in a specific order using the plurality of face images within the face direction map,
wherein the specific order includes at least two face images of the plurality of face images, each of the at least two face images having a highest similarity with an obtained moving image of the person's face.

12. A non-transitory computer-readable recording medium recording a program for causing a computer installed in a data processor to perform:
obtaining an image of a person's face;
creating a face direction map including a plurality of face images of the person's face facing a plurality of directions, the plurality of face images of the person facing the plurality of directions being created based on a same obtained image of the person's face; and
determine a type of movement of the person's face by tracking person a direction of the person's face in a specific order using the plurality of face images within the face direction map,
wherein the specific order includes at least two face images of the plurality of face images, each of the at least two face images having a highest similarity with an obtained moving image of the person's face.

13. The data processor according to claim 1, wherein the circuitry is configured to search the plurality of face images, included in the face direction map, for a face image having the highest similarity with an image in each frame of the obtained moving image of the person's face.

14. The data processor according to claim 13, wherein the circuitry is configured to determine a set of face images, from the plurality of face images, with the highest similarity with the image in each frame of the obtained moving image of the person's face, and to determine the type of movement of the person's face based on the determined set of face images.

* * * * *